United States Patent [19]
Guthrie et al.

[11] Patent Number: 5,836,228
[45] Date of Patent: Nov. 17, 1998

[54] APPARATUS FOR CUTTING SHEET MATERIAL

[75] Inventors: Duncan Richard Guthrie, Cambridge; David William Smith, Cambridgeshire; John David Wood, Cambridge, all of Great Britain

[73] Assignee: Shaikh Ghaleb Mohammad Yassin Alhamad, Riyadh, Saudi Arabia

[21] Appl. No.: 714,100

[22] PCT Filed: Mar. 27, 1995

[86] PCT No.: PCT/GB95/00670

§ 371 Date: Nov. 14, 1996

§ 102(e) Date: Nov. 14, 1996

[87] PCT Pub. No.: WO95/26838

PCT Pub. Date: Oct. 12, 1995

[30] Foreign Application Priority Data

Mar. 31, 1994 [GB] United Kingdom .................... 9406581

[51] Int. Cl.$^6$ .................................................. B26D 1/147
[52] U.S. Cl. .................................. 83/342; 83/345; 83/672
[58] Field of Search .............................. 83/672, 342, 343, 83/344, 345, 346, 678

[56] References Cited

U.S. PATENT DOCUMENTS

| | | | |
|---|---|---|---|
| 2,596,997 | 5/1952 | Harter | 83/343 X |
| 3,095,774 | 7/1963 | Hart | 83/342 X |
| 3,220,293 | 11/1965 | Barber | 83/673 X |
| 3,329,049 | 7/1967 | Hubbard | 83/678 X |
| 3,353,431 | 11/1967 | Mylo | 83/345 X |
| 3,550,826 | 12/1970 | Salmela | 83/678 X |
| 3,583,267 | 6/1971 | Topolski et al. | 83/345 X |
| 3,633,831 | 1/1972 | Dodson et al. | 83/345 X |
| 3,776,084 | 12/1973 | Slyvakov | 83/342 |
| 3,823,623 | 7/1974 | Currie et al. | 83/672 X |
| 3,891,494 | 6/1975 | Hunter | 83/678 X |
| 3,892,157 | 7/1975 | Currie et al. | 83/672 |
| 4,252,282 | 2/1981 | Vermeulen et al. | 83/835 X |
| 4,402,240 | 9/1983 | Moyer | 83/344 X |
| 4,493,235 | 1/1985 | Martin | 83/672 X |
| 4,523,448 | 6/1985 | Sakai et al. | 83/343 X |
| 5,001,017 | 3/1991 | Alhamad et al. | 482/573 |
| 5,095,597 | 3/1992 | Alhamad et al. | 29/6.1 |
| 5,097,907 | 3/1992 | Alhamad et al. | 169/45 |
| 5,142,755 | 9/1992 | Alhamad et al. | 29/6.1 |
| 5,207,756 | 5/1993 | Alhamad et al. | 29/6.1 |
| 5,297,416 | 3/1994 | Alhamad et al. | 72/379.4 |
| 5,402,852 | 4/1995 | Alhamad et al. | 169/46 |

*Primary Examiner*—M. Rachuba
*Attorney, Agent, or Firm*—Charles E. Cates; Frank T. Barber

[57] ABSTRACT

Apparatus for slitting or cutting material comprises a driving roller 10 and a driven roller 12. Each roller 10 or 12 has on its periphery a plurality of ribs at a predetermined pitch and helix angle. The pitch of the ribs 18 on the driving roller 10 is smaller than the pitch of the ribs 30 on the driven roller 12, and the helix angle of the ribs 18 on the driving roller 10 is of opposite direction to, and of smaller magnitude than, the helix angle of the ribs 30 on the driven roller 12. The ribs 18, 30 cooperate to cut with a shearing action a web 16 of sheet material fed into the nip between the rollers 10, 12.

6 Claims, 7 Drawing Sheets

SECTION 1

SECTION 2

SECTION 3

SECTION 4

SECTION 5

SECTION 6

APPARATUS FOR CUTTING SHEET MATERIAL

BACKGROUND OF THE INVENTION

This invention relates to apparatus for cutting sheet material, particularly (but not exclusively) for slitting a metal foil or web.

U.S. Pat. No. 5,142,755 discloses apparatus for slitting a metal foil for this purpose. The apparatus comprises two contra-rotating cylinders, one of which carries on its outer periphery a series of cutting knives, and the other of which is suitably recessed so as to accommodate the knives as the latter cut the metal foil between the two cylinders. Such an arrangement requires accurate registration of the knives and recesses and demands tight dimensional tolerances which are difficult to achieve in practice. The present invention aims to provide apparatus for cutting sheet material, for example cutting slits extending generally transverse to the longitudinal direction of a web of the material, in which the dimensional tolerances are less stringent.

SUMMARY OF THE INVENTION

According to the invention, there is provided apparatus for cutting sheet material, the apparatus comprising two rotatable members, namely a driving member and a driven member, each member having on its periphery a plurality of ribs at a predetermined pitch and helix angle, the pitch of the ribs on the driving member being smaller than the pitch of the ribs on the driven member, and the helix angle of the ribs on the driving member being of opposite direction to, and of smaller magnitude than, the helix angle of the ribs on the driven member. In use, the ribs on the driving member engages and drives the ribs on the driven member, and the ribs cooperate to cut the sheet material with a shearing action.

The driven member is preferably subjected to a restraining torque to ensure that the driven member remains in contact with the driving member.

Each member is preferably cylindrical with a continuous series of grooves around its periphery, each of said ribs being defined between a corresponding pair of the grooves. In a preferred embodiment, the driving member and driven member have the same number of ribs around their respective peripheries, the diameter of the driving member being smaller than the diameter of the driven member as a consequence of the smaller pitch of the ribs on the driving member as compared with the pitch of the ribs on the driven member.

The ribs on the driven member may be interrupted by slots so that the apparatus cuts slits across the width of the sheet material. Such a slitted sheet can be expanded to form a metal mesh. Alternatively, if each rib on the rib is continuous, the apparatus will cut the sheet material (across a width) into separate strips.

BRIEF DESCRIPTION OF THE DRAWINGS

Apparatus according to the invention will now be described, by way of example, with reference to the accompanying drawings, in which.

DETAILED DESCRIPTION OF THE INVENTION

Figure 1:
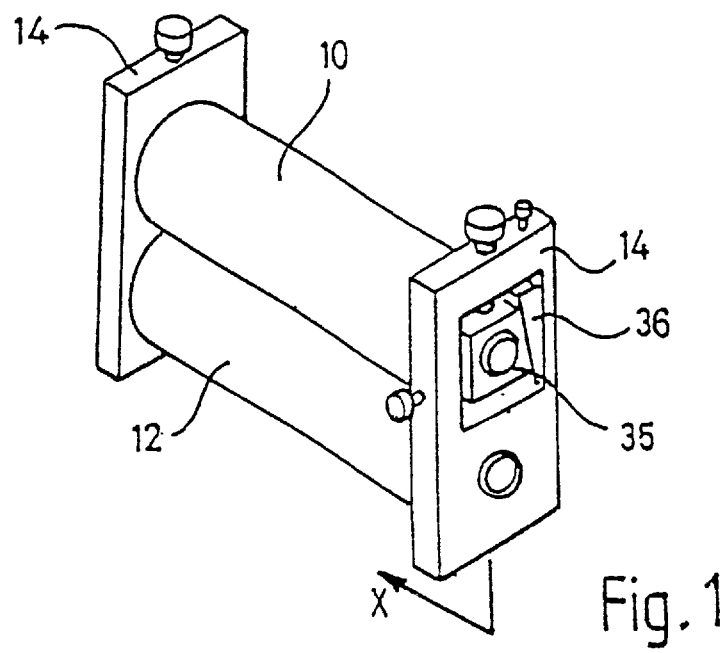
FIG. 1 is a perspective view of the apparatus.

Referring to FIG. 1, the apparatus comprises a driving member in the form of a generally cylindrical driving tool 10 and a driven member in the form of a generally cylindrical driven tool 12. The tools 10 and 12 are rotationally mounted in spaced supports 14, such that the tools 10 and 12 cooperate to form a nip through which is passed a web of metal foil indicated at 16 in FIG. 4.

Figure 2:
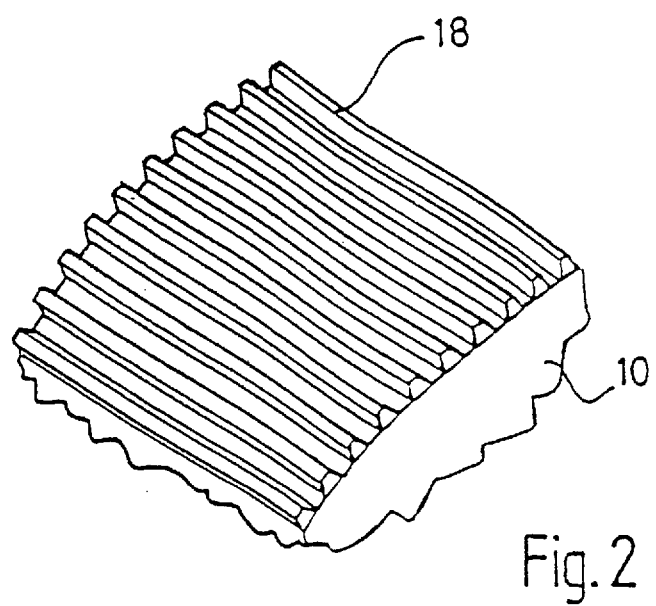
FIG. 2 is a fragmentary perspective view, to an enlarged scale, of part of a driving member of the apparatus.
Figure 5:
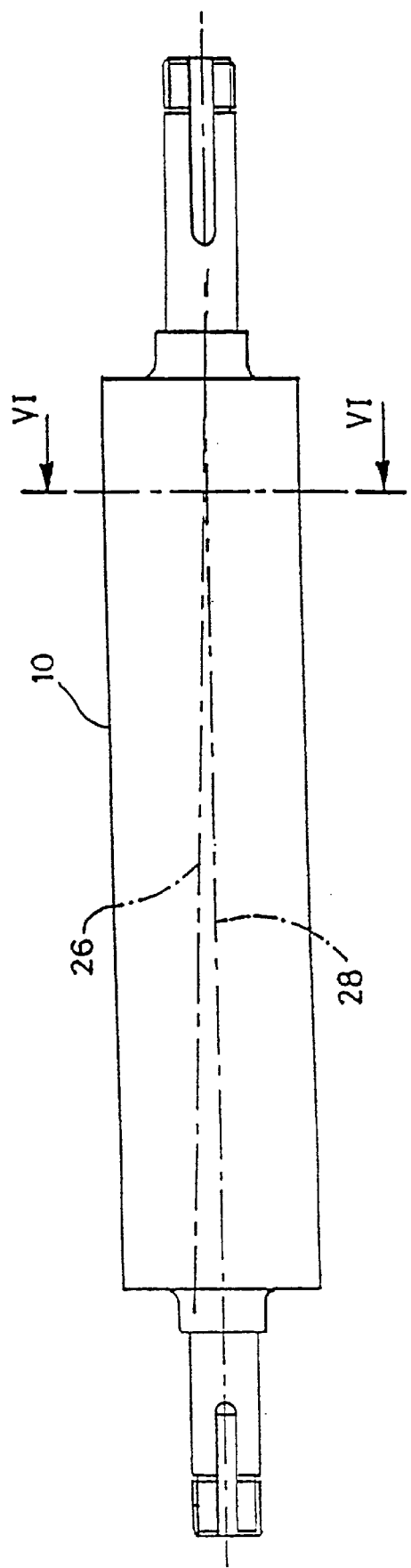
FIG. 5 is a front view of the driving member.
Figure 6:
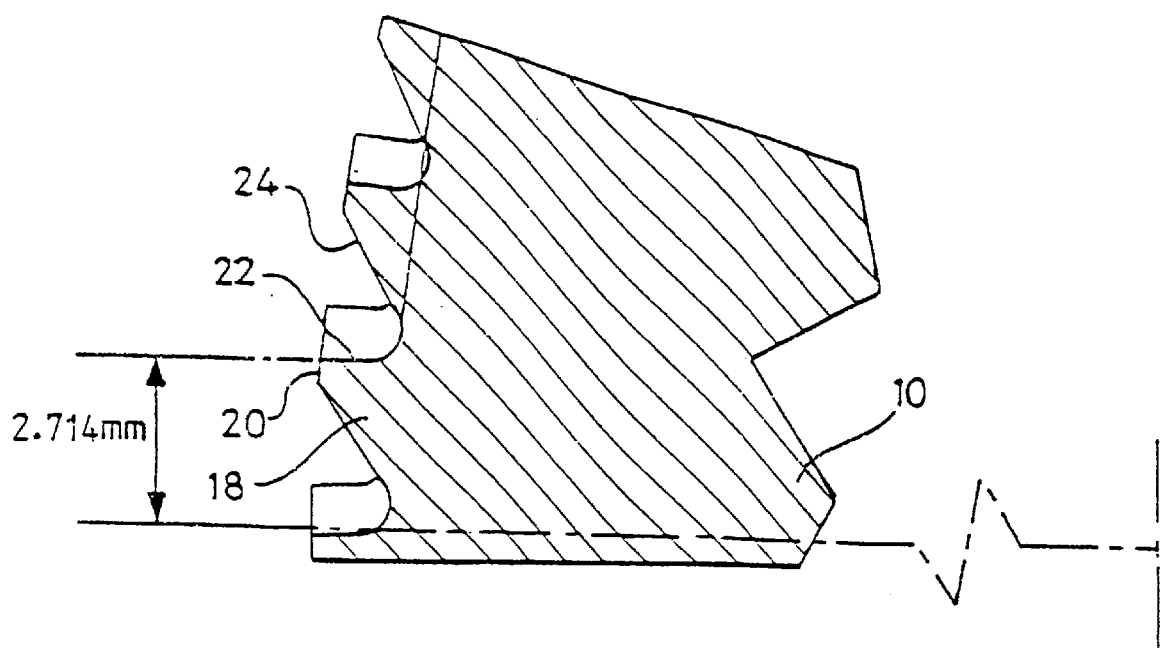
FIG. 6 is a fragmentary sectional view, on an enlarged scale, taken on the line VI—VI of FIG. 5.

The driving tool 10, shown in FIGS. 2, 5 and 6, has around its periphery seventy-two equi-angularly spaced grooves defining seventy-two equi-angularly spaced ribs 18 of identical shape and size. Each rib 18 has a radially outer surface 20 (FIG. 6) which is part cylindrical, a leading flank which in section presents a radial leading edge 22, and a trailing flank which in section presents a trailing edge 24 which is angled so as to define an angle of 59° between the trailing edge 24 and the leading edge 22 of the adjacent rib 18.

Each rib 18 extends in a helical path as shown by the broken line 26 in FIG. 5. From one radial end face of the driving tool to the other radial end face (a distance of 280 mm), each rib 18 undergoes an angular displacement of 5.71°, with a right-hand helix angle of 0.586° about the central axis 28 of the driving tool 10. The trailing flanks of the ribs 18 are visible in foreshortened view in FIG. 6.

Figure 3:
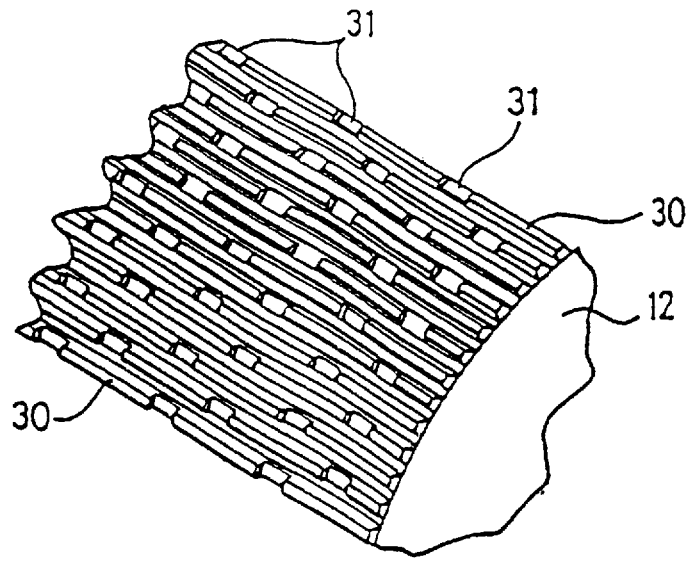
FIG. 3 is a fragmentary perspective view, to an enlarged scale, of part of a driven member of the apparatus.
Figure 7:
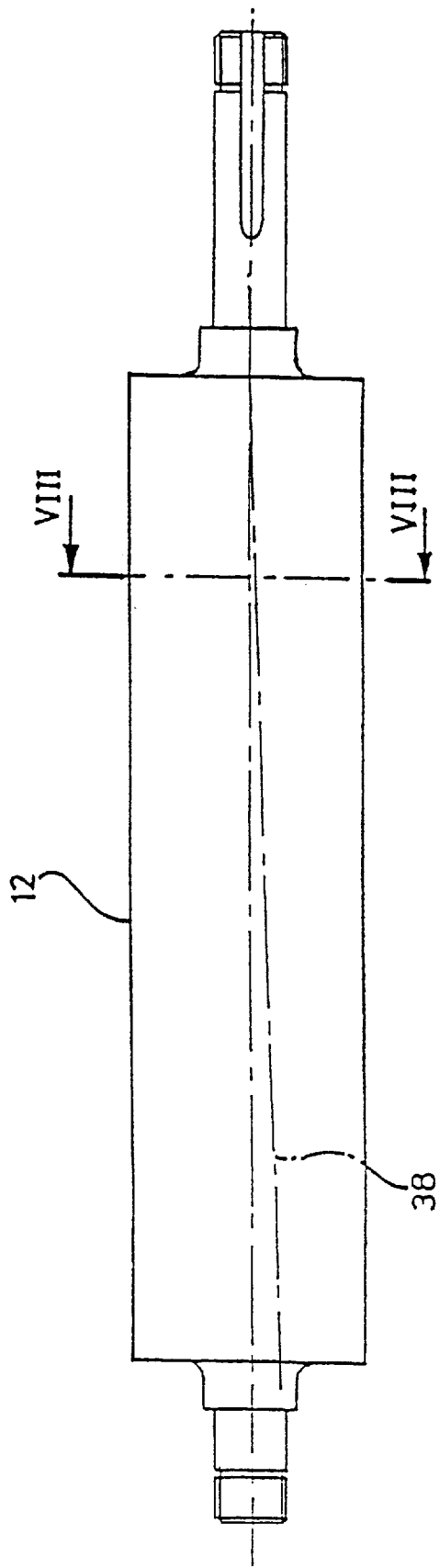
FIG. 7 is a front elevational view of the driven member.
Figure 8:
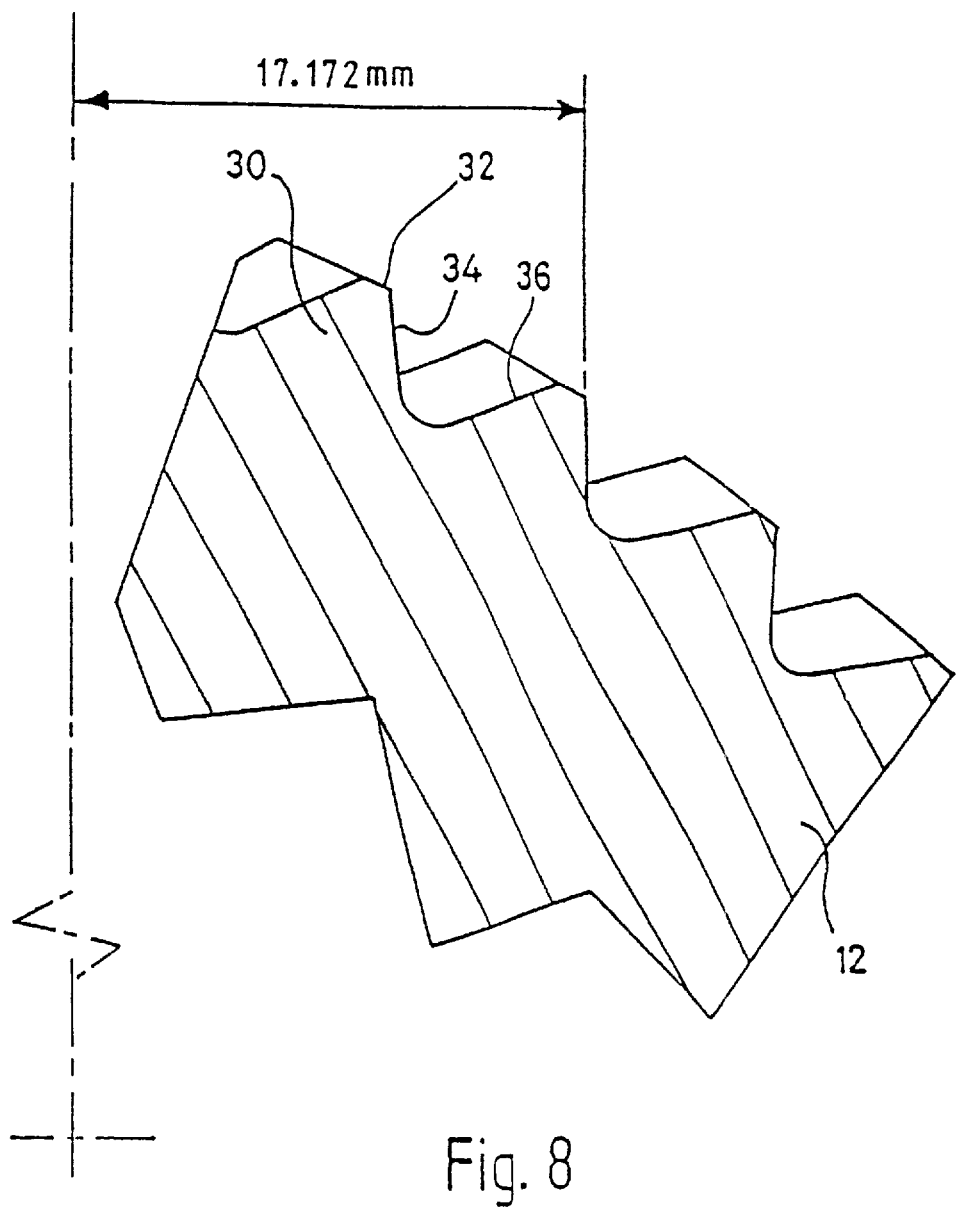
FIG. 8 is a fragmentary sectional view, on an enlarged scale, on the line VIII—VIII of FIG. 7.

The driven tool 12, shown in FIGS. 3, 7 and 8, also has around its outer periphery seventy-two equi-angularly spaced grooves defining seventy-two equi-angularly spaced ribs 30. Each rib 30 is interrupted by sixteen slots 31 (FIG. 3), and the ribs 30 are at a different helix angle and pitch than the ribs 18 of the driving tool. Referring to FIG. 8, it can be seen that each rib 30 has a radially outer surface 32 which is part cylindrical, a trailing flank presenting a radial trailing edge 34, and an angled leading flank presenting a leading edge 36, which makes an angle of 75° with the trailing edge 34 of the adjacent rib. The diameter of the driven tool is 71.873 mm, compared with the diameter of the driving tool of 65.637 mm. Because there are seventy-two ribs on each of the driving tool and the driven tool, the pitch of the ribs 18 on the driving tool 10 is 0.91 of the pitch of the ribs 30 on the driven tool 12.

Each rib 30 on the driven tool 12 extends in a helical path 38 (FIG. 7) between the end faces of the driven tool, the helix angle being opposite in direction to the helix angle of the ribs 18 on the driving tool 10. From one radial end face of the driven tool to the other radial end face (a distance of 280 mm), each rib undergoes an angular displacement of 5.810°, with a left-hand helix angle of 0.6519°, so the helix angle of the ribs 30 on the driven tool is greater in magnitude than, and opposite in direction to, the helix angle of the ribs on the driving tool.

The driven tool is rotationally mounted and has associated therewith means for applying thereto a restraining torque which maintains the driven tool in contact with the driven tool.

In use, the driving tool 10 is rotationally driven, and the radial leading edge 22 of a rib 18 will engage the radial trailing edge 34 of a rib 30 to cause the driven tool 12 to be rotationally driven in the opposite direction. The metal foil web 16 is fed into the nip between the tools 10 and 12 and is cut by the cooperating ribs to form a number of slits extending substantially transversely across the width of the web, the slits being interrupted as a consequence of the slots 31.

As shown in FIG. 1, one end of the driving tool 10 is adjustable in position to vary the lead angle of the driving tool and thereby facilitate smooth running. This is done by mounting the bearing block 35 (rotationally supporting one end of the driving tool) against a wedge 36, which is adjustable in position by a screw. The foregoing arrangement provides adjustment means to adjust or alter the angle of skew between the rotational axes of the driven tool and the driven tool.

Figure 9:
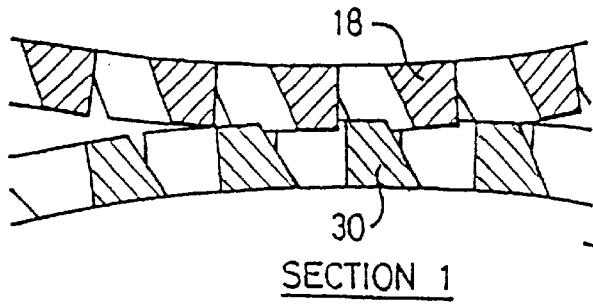
FIG. 9 is a series of sectional views taken at successive positions in the direction of arrow X in FIG. 1.
Figure 9:
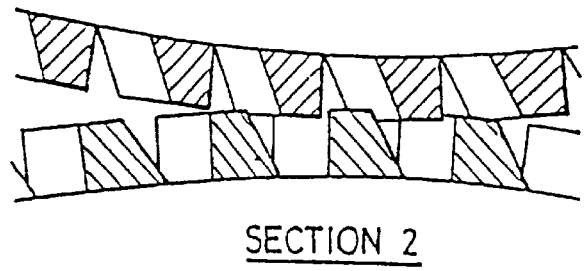
Figure 9:
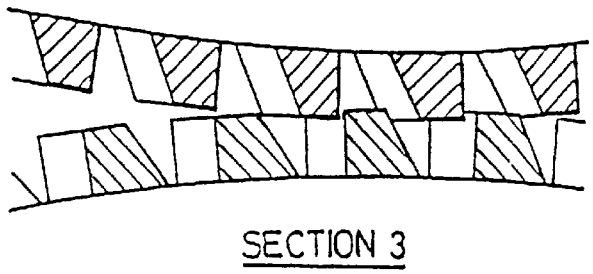
Figure 9:
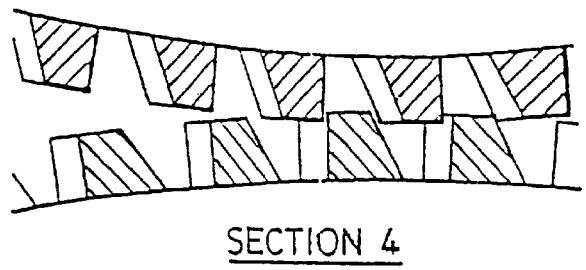
Figure 9:
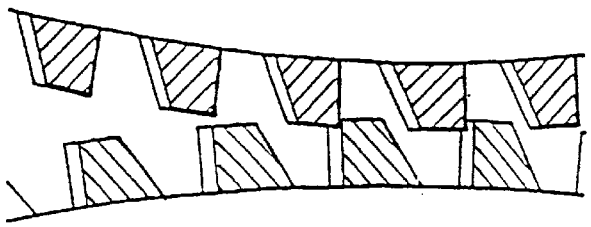
Figure 9:
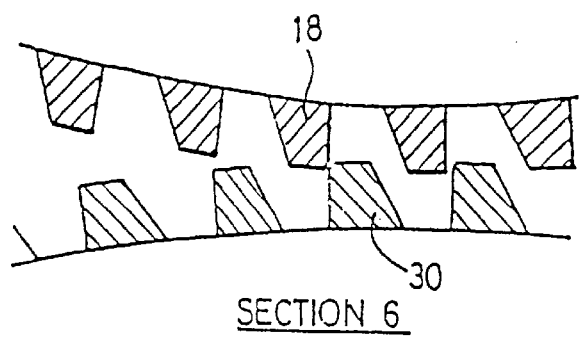

FIG. 9 is a series of sectional views taken at the same instant and at a series of positions in the direction of arrow X in FIG. 1. Section 1 of FIG. 9 is taken through a plane at the nearer end of the interengaged tools as viewed in FIG. 1, and Section 6 is taken through a plane at the further end of the interengaged tools as viewed in FIG. 1. At the instant of time depicted in FIG. 1, cutting of the web is taking place at Section 6, the ribs overlapping here by about 0.3 mm. Shortly after this, cutting will cease at Section 6 and will then commence at Section 1, proceeding through Sections 2 to 6 successively. Hence, cutting takes place at a localized region which moves progressively along the nip, in the axial direction of the tools, until it reaches the far radial ends of the tools as viewed in FIG. 1, before jumping back to the near radial ends as viewed in FIG. 1.

Figure 4:
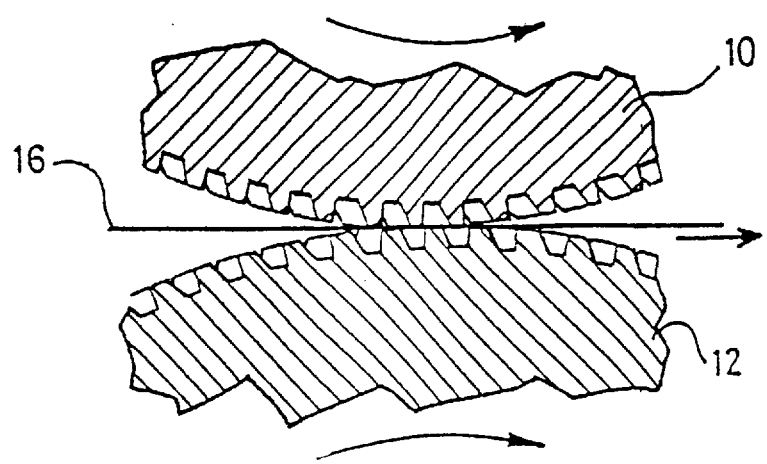
FIG. 4 shows a web of sheet material passing between the driving member and the driven member and being cut thereby.

The profiles of the ribs 17 and 30 are accurately shown in FIGS. 6 and 8 and diagrammatically represented in FIGS. 4 and 9.

The differing helix angles and the differing pitches of the ribs 18 and 30 provide relief for the ribs and so prevent them from damaging one another, whilst ensuring that the tools are synchronized and that localized engagement takes place between the respective radial edges to provide a shearing action which cuts the slits across the metal web. The latter may be subsequently expanded to make a metal mesh.

The slit metal web is expanded to form a metal mesh which can be used to extinguish fires, control explosions, or as an architectural mesh, reinforcement within paneling, composition flooring, walkways, stair treads, all cut and expanded in a range of materials from aluminum to stainless steel.

An alternative design for the driven tool 12 is to have continuous ribs such that the sheet material is continuously cut across its width to produce separate strips, such as that produced by shredding machines.

An alternative tooling arrangement is to locate the tools such that the driving tool is surrounded by two or more "satellite" driven tools. The driving tool will have cutting edges which determine the pitch of the final cutting pattern (in the web direction). The satellite tools will have cutting edges machined at larger angular pitches. Their pitch will depend on the total number of satellite tools and the required number of pitches before the cutting pattern is repeated. The same design rules will be applied to these tools as with the simple two tool system (i.e., the driving tool arranged to turn the driven tools against a fixed resisting torque, a difference in linear pitch between driving and driven tools, and a helix angle on each tool which is different in both magnitude and direction). The main advantage of this system over the simple two tool arrangement is that a complex pattern of cuts with a small spacing between cuts can be produced by tooling which is relatively simple to manufacture.

At present there are no obvious limits to the range of web thicknesses and materials that can be cut using apparatus according to the invention.

We claim:

1. An apparatus for cutting sheet material, the apparatus comprising two generally cylindrical rotary members characterized by a driving member (10) and a driven member (12), each member having on the periphery thereof a plurality of ribs (18), (30) at a predetermined pitch and helix angle, the pitch of the ribs (18) on the driving member (10) being smaller than the pitch on the ribs (30) on the driven member (12) and the helix angle of the ribs (18) on the driving member (10) being of opposite direction to, and of smaller magnitude than, the helix angle of the ribs (30) on the driven member (12), the said ribs (18) on the driving member (10) being operable to engage and drive the ribs (30) on the driven member (12) and the ribs (18), (30) being operable to cooperate in cutting the sheet material (16) with a shearing action.

2. Apparatus according to claim 1, including means for applying a restraining torque to driven member (12) to ensure that the driven member (12) remains in contact with the driving member (10).

3. Apparatus according to claim 1, wherein each member (10), (12) is generally cylindrical with a continuous series of grooves around the periphery thereof, each of said ribs (18), (30) being defined between a corresponding pair of the grooves.

4. Apparatus according to claim 2, wherein the driving member (10) and driven member (12) have the same number of ribs (18), (30) around their respective peripheries, the diameter of the driving member (10) being smaller than the diameter of the driven member (12) as a consequence of the smaller pitch of the ribs (18) on the driving member (10) as compared with the pitch of the ribs (30) on the driven member (12).

5. Apparatus according to claim 1, wherein each rib (30) on the driven member (12) has a plurality of slots (31) spaced along the rib (30), whereby the sheet material (16) is cut to form a number of slits extending substantially transversely across the sheet material, the slits being interrupted by unslit areas as a consequence of the slots in the ribs (30).

6. Apparatus according to claim 1, including adjustment means to adjust the angle of skew between the rotational axes of the two rotatable members (10),(12).

* * * * *